Figure 1:
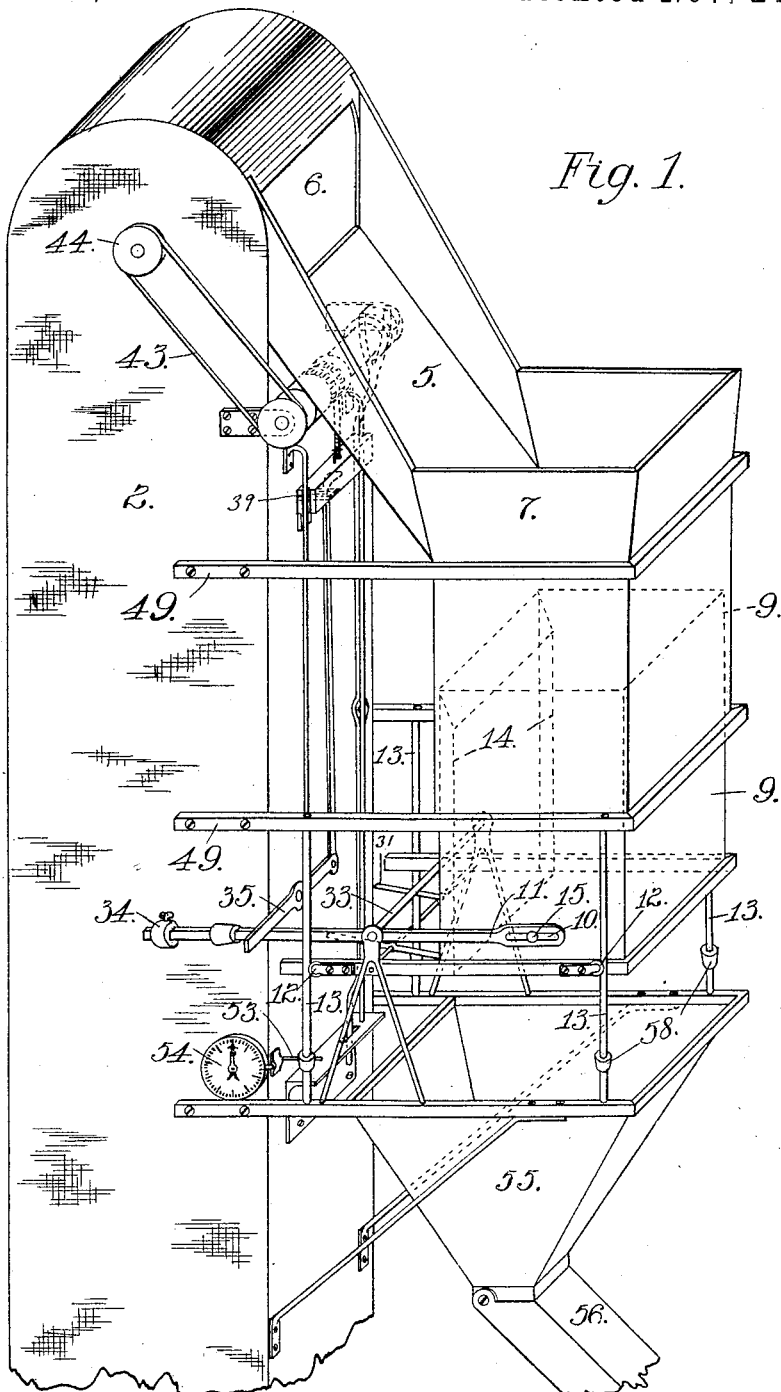

(No Model.)
2 Sheets—Sheet 1.

A. HUNT.
AUTOMATIC GRAIN MEASURING APPARATUS.

No. 571,922.
Patented Nov. 24, 1896.

Witnesses:
O. G. Bradbury.
H. S. Johnson.

Inventor:
Alva Hunt.
per: T. D. Marvin
Attorney.

(No Model.) 2 Sheets—Sheet 2.
A. HUNT.
AUTOMATIC GRAIN MEASURING APPARATUS.
No. 571,922. Patented Nov. 24, 1896.
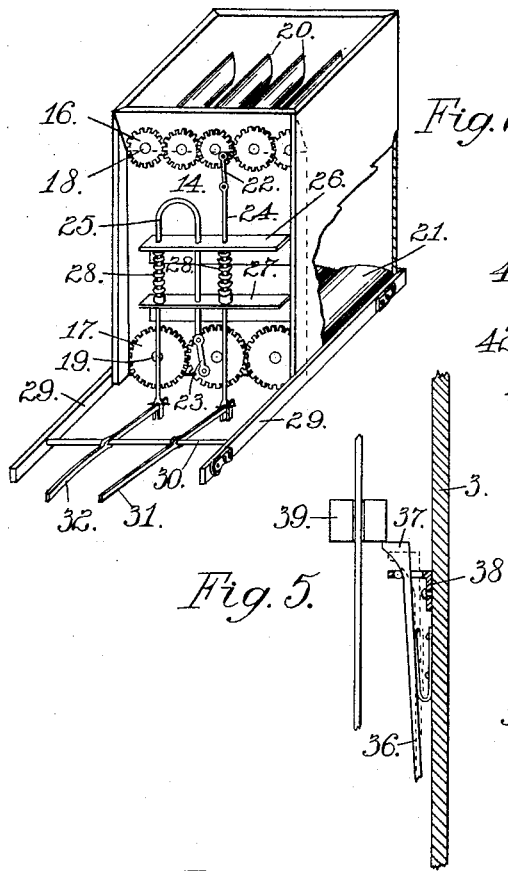
Witnesses:
O. G. Bradbury.
W. C. Swift.
Inventor:
Alva Hunt.
per: F. D. Menun
Attorney.

United States Patent Office.

ALVA HUNT, OF ST. PAUL, MINNESOTA.

AUTOMATIC GRAIN-MEASURING APPARATUS.

SPECIFICATION forming part of Letters Patent No. 571,922, dated November 24, 1896.

Application filed March 20, 1894. Serial No. 504,422. (No model.)

*To all whom it may concern:*

Be it known that I, ALVA HUNT, of St. Paul, Ramsey county, Minnesota, have invented certain Improvements in Automatic Grain-Measuring Apparatus, of which the following is a specification.

My invention relates to improvements in grain-measuring apparatus, its object being to provide an apparatus which may be used in connection with separators in the field as well as in connection with grain-elevators.

To this end my invention consists in a measuring-receptacle supported upon pivoted levers carrying counterbalancing-weights having a series of normally open shutters in the top and another series of normally-closed shutters in the bottom of the receptacle, the space between being of predetermined capacity. The shutters are operated by means of trip-levers, which are actuated by means of a falling weight released by the descent of the receptacle when filled, whereby the top shutters are closed and the bottom shutters opened to discharge the measure of grain. The falling of the weight also connects a hoisting device for the weight with a continuously-running source of power, whereby the weight is returned to its normal position ready to operate the tripping device again, the shutters at the top and bottom of the receptacle being at the same time returned to normal position.

The apparatus, when used in connection with separators in the field, is designed to be placed at such elevation as will enable it to discharge the measured contents into wagons or sacks.

My invention further consists in the construction and combination hereinafter particularly described and claimed.

In the accompanying drawings, forming part of this specification, Figure 1 is an isometrical projection of the apparatus, shown attached to a separator-elevator. Fig. 2 is a detail of the measuring magazine or receptacle. Fig. 3 is a vertical cross-section of the same. Fig. 4 is a detail of the tripping-weight and weight-lifting mechanism. Fig. 5 is a detail of the weight-supporting catch, and Fig. 6 is a detail of the lower end of the elevator.

In the drawings, 2 represents the elevator-case, 3 its grain-receptacle, and 4 the opening thereto into which the grain is discharged from the separator. 5 is the discharge-spout leading from the outlet 6 of the elevator-case to the hopper 7. Power is supplied to the elevator-belt from the separator by means of the pulley 8. A pulley 44 at the top of the elevator-case, driven by the elevator-belt, serves to transmit power to the weight-hoisting mechanism hereinafter described. The hopper 7 is supported by the frame pieces or arms 49, and into the hopper closely fits the measuring magazine or receptacle 9. This mechanism is supported upon the levers 11, having the pivot-fulcrum 33, by means of antifriction gudgeon-rolls 15, running in slots 10 in the levers, the weight of the magazine and the measure of grain being counterbalanced by the weights 34, adjustably secured upon the other ends of the levers.

12 are antifriction-rolls carried by the mechanism and gearing upon the guide-rods 13 to control the movement of the magazine. The side wall of the magazine adjacent the elevator is recessed to receive the series of intermeshing gears 16 and 17, mounted upon the shafts 18 and 19, suitably journaled in the walls of the magazine. These shafts carry the shutters 20 and 21, preferably of slightly-elliptical form, so as to reduce the resistance when turning in the grain. The bottom shutters 21 are preferably few in number and larger, so that when turned they offer free vent for the escape of the grain. The shutter-shafts are operated by means of the cranks 22 and 23, connected by the pitmen 24 and 25, running in guides 26 and 27 to the trip-levers 31 and 32, which have the fulcrum-pivot 30, supported on the arms 29, the springs 28 tending to hold the pitman set to keep the top shutters normally open and the bottom shutters normally closed.

39 is a weight vertically slidable on guide-rods 40 and supported in raised position by means of a catch 37, carried by the vertical rod 36, the lower end of which is connected to the pivoted lever 35 and the power end of which is engaged by one of the levers 11 when turned upward by the overbalancing-weight of the magazine and its contents, whereby the catch 37 is tripped to release the weight. This weight in falling strikes the levers 31 and 32, so as to reverse the normal position of the shutters with which they are operatively connected, as hereinafter described. The weight 39 is hoisted to normal position after its fall by means of the strap or cord 46, connected to the winding-drum 45, which is arranged upon the horizontal shaft 41. This shaft has the loose pulley 42, connected to a continuously-running source of power, and the shaft is set in motion by means of the clutch 47, which is operated by means of the lever 50, engaging a slot 48 in the drum and having a pivot-fulcrum 57. This lever is bent at points 51 and 52, so as to be engaged by the weight 59 when at its top position, so that the clutch is thrown out of engagement with the drum, and at its lower position when it strikes the levers 31 and 32, so as to operate the lever to throw the clutch into engagement with the drum, thereby setting the same in motion to restore the weight to normal position. The weight in its fall also strikes the lever 53, which operates a registering device, (conventionally indicated by 54.)

In operation, the elevator belt being operated by means of the power applied to the pulley 8, the grain is carried up and delivered from the chute 5 into the hopper 7, thence descending into the magazine. When the requisite weight of grain therein has been secured, the power ends of the levers 11 are tilted upward, one of them tripping the lever 35, thus causing the weight 39 to be released, which in its fall is arranged to strike the lever 31, thereby closing the shutters 20 in the top of the magazine, next striking the lever 32, which opens the shutters 21, discharging the contents of the magazine. The weight also strikes the lever 53, operating the register and engaging at the bottom of its descent the bend 51 of the lever 50, operating the lever to throw the clutch 47 into engagement with the winding-drum, thus operating it to hoist the weight back to its normal position, where it is caught and held by the catch 37, in which position it engages also the bend 52 of the lever, throwing the clutch out of engagement with the drum and stopping its further revolution. When the weight 39 is lifted from the levers 31 and 32, the springs 28 return the connected parts to their normal position again, opening the shutters at the top of the magazine and closing those at the bottom. The grain as discharged from the magazine falls into the hopper 55, thence passing through the spout 56 to a suitable receiving-receptacle.

I claim—

1. In a device of the class described, the combination of the counterweighted magazine, the series of rotary shutters for closing the top and bottom of said magazine, the springs normally holding the bottom shutters closed and the top shutters open, the mechanism for operating said shutters, and the tripping-weight operated by the weight of the grain in the magazine to actuate said mechanism to reverse the position of said shutters.

2. In an apparatus of the class described, the combination with the chute and hopper, of the counterweighted magazine, the series of rotary shutters for closing the top and bottom of said magazine, the cranks and pitman for operating said shutters, the springs normally holding the bottom shutters closed and the top shutters open, the trip-levers connected to said pitman, and the tripping-weight adapted to actuate said levers to reverse the position of said shutters.

3. In an apparatus of the class described, the combination with the grain-chute and hopper, of the vertically-movable magazine arranged underneath the same, the counterbalancing-weight therefor determining its capacity, the series of rotary shutters in the top and bottom of said magazine, the means for normally holding the bottom shutters closed and the top shutters open, the shutter-operating cranks, pitman, and levers, the trip-weight adapted to actuate said levers, the means connected to the running parts of the apparatus for lifting said weight to normal position, and the catch for supporting it in such position.

4. In an automatic grain-measuring device, the grain-receptacle therefor, having in combination the normally open shutters at the top, the normally closed shutters at the bottom, series of successively-gearing cog-wheels, each of which operates one of the upper shutters, and a similar series each of which operates one of the lower shutters, reciprocating rods, each of which is attached to one of each series of cog-wheels, and means operative to reciprocate said rods.

5. In an automatic measuring device, the combination with the measuring-receptacle thereof, having means for subdividing off a certain quantity of the contents of the receptacle, of the pivoted lever or levers having on one end said measuring-receptacle and on the other weights adapted to be adjustably located on said levers so as to approximately balance the weight of the receptacle and a measure of grain therein, the trip engaged by said lever or levers, and the weight adapted to be released by said trip when so engaged and to operate to separate off and discharge a certain measure of grain from the magazine.

In testimony whereof I affix my signature in presence of two witnesses.

ALVA HUNT.

Witnesses:
W. C. SWIFT,
F. G. BRADBURY.